United States Patent [19]

Jones et al.

[11] Patent Number: 4,898,012
[45] Date of Patent: Feb. 6, 1990

[54] ROLL BITE GAUGE AND PROFILE MEASUREMENT SYSTEM FOR ROLLING MILLS

[75] Inventors: George B. Jones; Edward A. Mills, both of Pittsburgh, Pa.

[73] Assignee: United Engineering, Inc., Pittsburgh, Pa.

[21] Appl. No.: 184,830

[22] Filed: Apr. 22, 1988

[51] Int. Cl.⁴ ............................................. B21B 37/00
[52] U.S. Cl. ......................................... 72/11; 29/112; 29/116.2
[58] Field of Search ................... 72/11, 16, 17, 19, 20, 72/21, 241; 29/111, 112, 116.2; 100/160, 168, 176

[56] References Cited

U.S. PATENT DOCUMENTS

| | | | |
|---|---|---|---|
| 3,587,265 | 6/1971 | Sivilotti | 72/11 |
| 4,428,244 | 1/1984 | Takeda | 72/17 |
| 4,509,237 | 4/1985 | Volz et al. | 72/11 |
| 4,570,472 | 2/1986 | Kuwano | 72/11 |
| 4,691,547 | 9/1987 | Toch et al. | 72/11 |

FOREIGN PATENT DOCUMENTS

| | | | |
|---|---|---|---|
| 0121050 | 6/1985 | Japan | 29/112 |
| 0755353 | 8/1980 | U.S.S.R. | 72/11 |

Primary Examiner—Howard N. Goldberg
Assistant Examiner—Irene Cuda
Attorney, Agent, or Firm—Parmelee, Miller, Welsh & Kratz

[57] ABSTRACT

A rolling mill for rolling strip in which one of its rolls serves both as a mill roll and as a gauge and/or profile measuring roll. The one roll has an outer sleeve for deflection under the rolling force and an internal stationary member for carrying a number of axially supported sensors for measuring the deflection of the sleeve and the rolling force to which the sleeve is subject, and control means for receiving signals from the sensors to produce a signal representative of the gauge and/or profile of the strip as it is being rolled in the roll bite of the mill.

5 Claims, 2 Drawing Sheets

ROLL BITE GAUGE AND PROFILE MEASUREMENT SYSTEM FOR ROLLING MILLS

BACKGROUND OF THE INVENTION

The invention pertains to apparatuses for processing metals, rubber, plastics, paper and the like, in which a pressure applying element such as a roll or platen is employed to control the thickness and profile of the material. For the purpose of describing the invention without intention of limitation its use in a rolling mill has been selected.

The usual and customary type of rolling mill consisting of two vertical spaced apart housing posts for rotatively supporting a vertical stack of rolls, comprising usually between two to six rolls, inherently possesses two characteristics that result in undesirable gauge and profile rolled product deviations. These two well known limitations have reference to "varying mill stretch" and "varying roll bending", the former referring to the spring of the mill parts caused by the varying rolling force and the latter to the deflection of the rolls between their supported ends, again as a result of the varying rolling force.

These fundamental equipment limitations have been well recognized since the inception of the vertical stack rolling mill design and there has been a continuous effort made in many and sundry ways to lessen or eliminate the adverse affects. Notwithstanding, there still remains today a critical need to improve on prior attempts and particularly as current and future increased product quality is considered.

As reflected in past efforts, critical to improved results is some form of measuring device for determining as quickly, accurately and reliably as possible the rolled gauge and/or profile of the material. By way of a brief explanation of these terms, which are well recognized in the industry, by gauge it is meant to refer to the longitudinal thickness of the rolled material, such as a steel strip or plate taken on a given longitudinal axis of the strip, and by profile the cross sectional thickness of the strip, at several transverse points. In the context of this discussion these strip characteristics are the result of and caused by the act of rolling as distinguished from the condition of the strip having these characteristics before it is introduced into the roll bite.

Examples of such devices include X-ray gauges for measuring strip profile and gauge. All of these devices are located adjacent to the mill but at a distance downstream of the roll bite. Included in each profile system is a control system for initiating corrective action by well known means such as roll bending, variable crown back-up rolls, roll shifting-crossing, zoned roll cooling sprays, etc.

All of the above devices and systems were subject to three important limitations, all involving transport times, namely the time involved in the strip passing from the roll bite to the measuring device, the time the control takes to determine what action is to be taken and to initiate appropriate corrective action, and the time the means for effecting the corrective action takes to accomplish it. These drawbacks are exasperated by the fact that the usual X-ray gauges are arranged after the last stand of the tandem mill so that there is no opportunity to effect correction on a stand by stand basis.

In addition to the above noted problems surrounding profile considerations, separate and additional problems are found in prior art gauge control systems i.e. some form of the BISRA Automatic Gauge Control (AGC), that employ some part of the rolling force in determining and correcting for gauge variations. These systems include a rolling force signal in the form of a feedback signal, the rolling force being measured by load cells and/or pressure transducers, the latter associated with the roll gap actuator hydraulic cylinders and which systems suffer from the well known mill phenomena of modulus variation and hysteresis and roll eccentricity that result in production of off-gauge strip.

SUMMARY OF INVENTION

The present invention provides a roll bite gauge and profile measuring system for a rolling mill or the like which will eliminate the present day above noted transport time constants caused by the spaced relationship between the roll bite and the measuring device and the time constant of the device itself, particularly such as X-ray devices, and eliminate the aforesaid mill modulus-hysteresis effects and roll eccentricity, at least that of the backup rolls, and allow for a very rapid, accurate and reliable correction system on a per stand basis when employed in a tandem mill.

More particularly, the invention provides, either as an integral part of one of the work rolls or as one of the other rolls in the mill roll stack of three or more rolls, a roll bite gauge and/or profile measuring system arranged internally in the combined mill-measuring roll. The dual function roll may comprise an elongated outer sleeve which is subject to the rolling force either as the work roll, intermediate roll or backup roll, its center portion being provided with one or more recesses or a continuous opening for receiving along its axial length several spaced sensors for measuring the roll bite opening and hence the gauge and/or profile of the strip in terms of a change in the rolling force in the mill roll bite. The sensors, either as described or as additional ones, may take the form of position or pressure transducers, in which the sensors can form part of a force AGC System.

In the preferred form, the dual function roll takes the form of the intermediate roll of a 5 Hi mill having a diameter sufficient to allow minimum optimum diameter work rolls to be employed in applications where this is desirable and the sensors can be mounted stationarily and internally in the roll.

SUMMARY OF DRAWINGS

The present invention may be better understood when the following description is read along with the accompanying drawings of which.

DETAIL DESCRIPTION OF THE INVENTION

Figure 1:
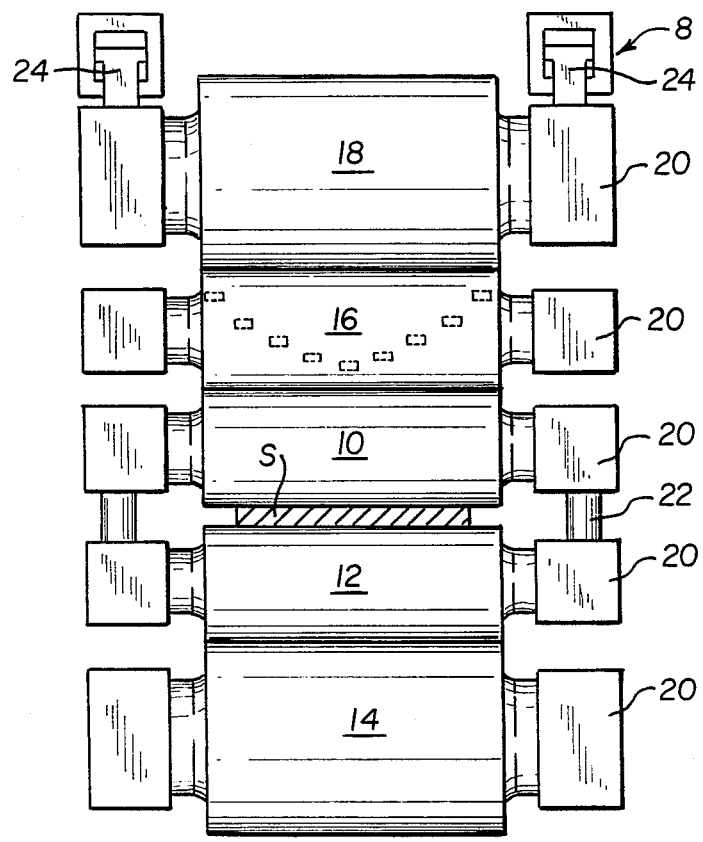
FIG. 1 is a schematic elevational view of a 5 Hi mill, in which the intermediate roll is the roll bite gauge and profile measuring roll of the present invention.

Before referring to the rolling mill and its component parts illustrated in the drawings, it will be appreciated that the mill and parts, except for the intermediate roll, are well known in the art, as are the problems surrounding uniform strip gauge and profile as well as the phenomena of mill modulus-hysteresis and roll eccentricity. An article illustrating and describing typical mill construction of a 4 Hi type, including well known technology of the force AGC gaugemeter systems, hysteresis and roll eccentricity appears in "Iron and Steel Engineer Year Book" entitled, Mill modulus variation and hysteresis—Their effect in hot strip mill AGC, by G. E. Wood et al.—pages 33–39, 1977.

FIG. 1 illustrates a typical 5 Hi strip rolling mill 8 consisting of a pair of work rolls 10 and 12 between which a strip S is reduced, the lower work roll 12 being backed up by a backup roll 14 whereas the upper work roll 10 is backed up first by an intermediate roll 16 which in turn is backed up by a backup roll 18. The diameters of the work rolls 10 and 12 are the same, as are the diameters of the backup rolls 14 and 18, whereas the diameter of the intermediate roll 16 is substantially larger than that of the work rolls but substantially smaller than that of the backup rolls. FIG. 1 also indicates that the ends of each of the rolls have customary bearing-chocks such as indicated at 20, work roll balance piston cylinder assemblies at 22 and roll gap adjusting piston cylinder assemblies at 24. In the mill illustrated, the work rolls are meant to be driven in a customary manner by a drive not shown.

Figure 2:
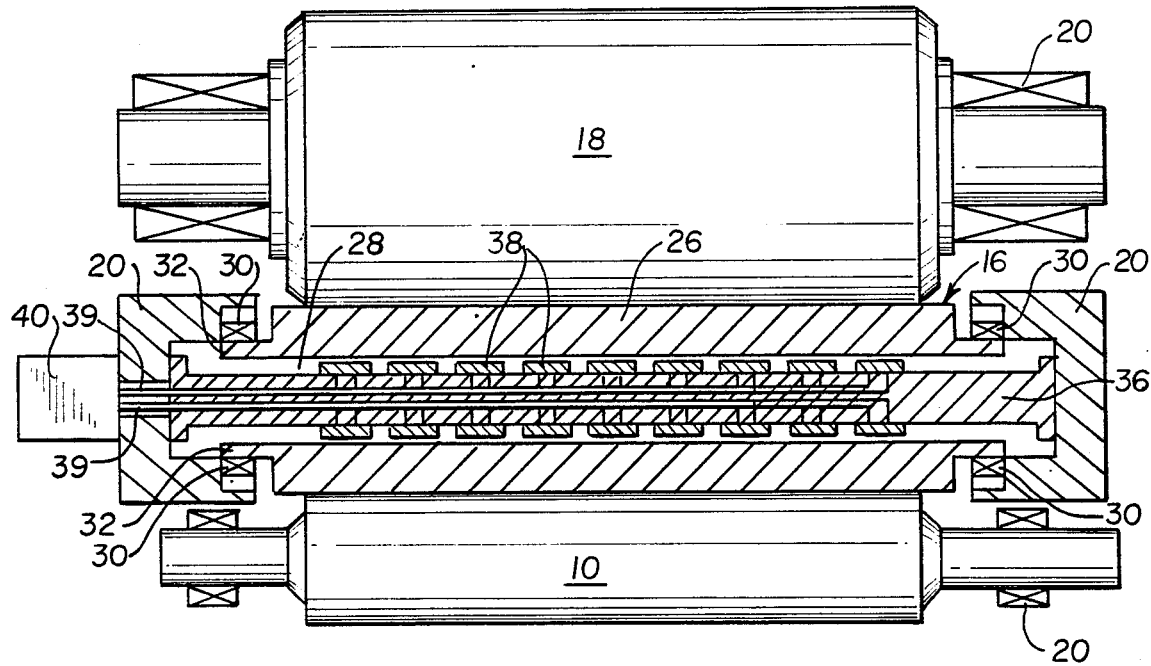
FIG. 2 is a view similar to FIG. 1 but more in detail and illustrating only the upper three rolls of the mill.
Figure 3:
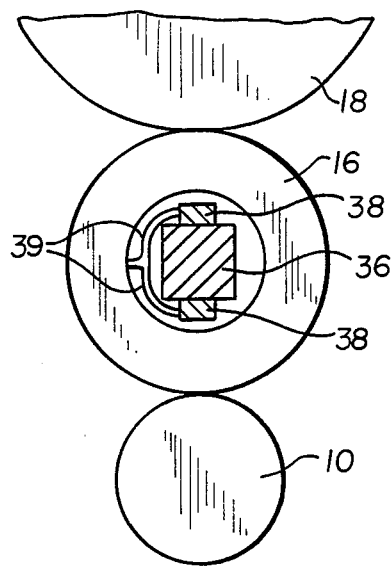
FIG. 3 is an end view, with certain parts omitted, of the mill parts shown in FIG. 2.
Figure 4:
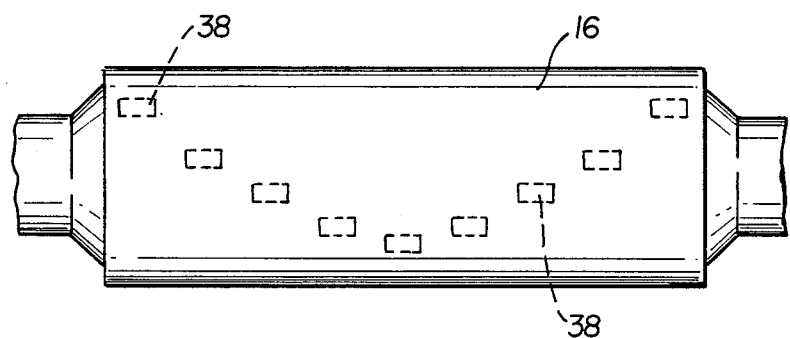
FIG. 4 is an outline view serving to illustrate one form of the spiral arrangement of the sensors mounted in the intermediate roll of the earlier figures.

As noted, the present invention relates to providing a means for measuring the gauge and/or profile of the strip in the roll bite, in which, in the illustrated form, this is accomplished by providing a specially constructed intermediate roll 16, the special construction being shown in FIGS. 2–4.

In FIG. 2 only the three upper rolls of the mill 8 are shown, in which particular reference will only be made now to the intermediate roll 16. It consists of an outer metallic sleeve 26 of a substantial thickness having a roll face, slightly longer in length than the associated backup roll 18 and work roll 10, and an internal axial opening at 28. The metal of the roll can be one of the alloy iron or steel metals presently used in roll technology and, if desired, the rolls can be provided with customary machined crowns, such as no crown on the intermediate roll 16 and crowns provided on the other rolls. The bearing-chocks 20 of the roll 18 are specially constructed in the form of C-shaped elements for rotatively supporting the sleeve 26 at its opposite ends through anti-friction bearings 30 arranged to engage projections 32 of the sleeve and the horizontal extensions of the chocks.

Arranged inside the opening 28 of the sleeve 26 is a stationary metallic member 36 which as shown is bolted to the chocks at it opposite ends through which connection it is supported by the opposed chocks 20. The member 36 supports a number of sensors 38 along its length in a spiral fashion as shown in FIG. 4. The sensors illustrated are meant to indicate proximity transducers but could take other forms such as load cells or pressure transducers, which, if employed, may require some design changes to the sleeve from the construction illustrated. All of these devices are generally well known in the mill design industry. FIGS. 2 and 3 indicate that the wiring 39 from each transducers 38 is run to the left as one views FIG. 2 into a part of an electronic control 40.

FIG. 4 shows the spiral placement of the sensors 38, it being appreciated that many other forms could be used and that several distinct systems of spirals can be employed such as 180° opposite or 90° circumferentially disposed. The relative axial close spacing and one or more spiral arrangements of the sensors 38 and the positioning of the sensors adjacent to the inside surface of the sleeve 26 allows a reliable and accurate measurement of the profile and/or gauge across the passing strip while it is being reduced by the work rolls 10 and 12. The sensors' measurement will actually be a measurement of the amount or degree of deflection of the intermediate roll 16 which will be equal to that of the work roll 10, and, as to the gauge control aspect, a change in the rolling force instead of the absolute force, the former being preferred in present force AGC roll gap control systems.

Figure 5:
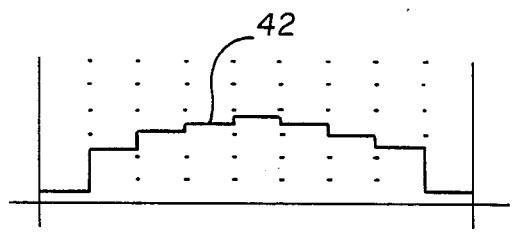
FIG. 5 is a strip profile curve.

In describing now one mode of operation employing the intermediate roll 16 in the first stand of a finishing train of a wide strip mill for rolling mild carbon steel, let it be assumed that the strip S is being rolled in the stand 8 and the rolled condition of the strip, from a profile stand point, is as indicated in FIG. 5 by the curve 42.

This condition will actually be measured by the sensors 38 and, if desired, produce for the operator an instantaneous video CRT representation of the curve 42 of FIG. 5. At the same time, the control 40 will initiate the proper correction signal to the profile correction mechanism provided with the mill to control strip profile, such as a rolling bending unit or other devices noted earlier. As noted, the sensors 38 can be also employed to send electrical signals to the control 40 which will compute from the degree of deflection of the intermediate roll 16 the amount of change in the rolling force and initiate a corrective signal, if necessary, to the piston cylinder assemblies 24 to connect any gauge error according to the well known practice in operation of a force AGC System.

Since the sensors 38 continuously monitor the gauge and profile in the roll bite, the limitations of transport time noted earlier are eliminated entirely on a per stand bases as well as the elimination of the mill modulus variations and hysteresis and roll eccentricity problems discussed before. It should be also noted that the illustrated 5 Hi mill allows smaller diameter work rolls to be employed as compared with typical 4 Hi strip mills, from which flows the advantages of greater reductions and/or reduced rolling force for the mill.

While one form of the present invention has been illustrated and described, it will be appreciated that the invention can be practiced in many other types of mills such as 2 Hi and 4 Hi mills, in which the sensor roll can be the work roll or work rolls, or backup roll or back up rolls, and can be used in many other types of machinery such as those employed for processing rubber, paper and plastic.

What we claim is:

1. A rolling mill for processing strip material, said mill having at least two rolls, one of which is arranged to serve as either a work roll or a backup roll and subject to and deflected between its ends by the rolling force of the mill developed in rolling the material, said one roll also serving as a means for measuring certain characteristics of the material, such as gauge and profile, and comprising an outer cylindrical sleeve having an outer surface subject to the rolling force, means for rotatively supporting said sleeve at its opposite ends, and means arranged in the interior of said sleeve for supporting several sensor means axially along the length of said sleeve to measure said material characteristics of different points transversely of the material as the material contacts said outer surface of said sleeve and is subject to the rolling force.

2. A rolling mill according to claim 1, wherein said rolls of said rolling mill include a pair of work rolls and a backup roll for each work roll and at least one intermediate roll arranged between one of said work rolls and its associated backup roll, said intermediate roll having a diameter substantially larger than the diameter of its associated work roll and a diameter substantially smaller than its associated backup roll.

3. A rolling mill according to claim 1, wherein said sensor means are of the type that produce their measurement as a result of the deflection of said one roll when subject to the rolling force.

4. A rolling mill according to claim 1, wherein said means for supporting said sleeve comprises stationary bearing chocks for rotatively supporting the opposite ends of said sleeve;

said means for supporting said sensor means comprises a stationary member extending axially along the length of said sleeve and supported at its opposite ends by a different one of said bearing chocks, and additional means for measuring at least part of a change in the rolling force transferred from said one roll.

5. A rolling mill according to claim 4 wherein said measured characteristics of the material include the gauge and profile of the material, and said rolls form a roll bite, means are provided for arranging each of said sensor means to measure the profile at different transverse points of said material and producing representative signals thereof, an additional means is provided including means for producing a representative rolling force signal, and control means are provided for receiving said signals from said sensor means and said additional means for producing representative output signals of the gauge and the profile characteristics of the material as it is being rolled in said roll bite.

* * * * *